United States Patent [19]

Stroud

[11] Patent Number: 4,720,645
[45] Date of Patent: Jan. 19, 1988

[54] DUAL OUTPUT ALTERNATOR

[76] Inventor: Lebern W. Stroud, 321 Charleston Pl., Hurst, Tex. 76053

[21] Appl. No.: 57,712

[22] Filed: Jun. 1, 1987

Related U.S. Application Data

[63] Continuation of Ser. No. 801,137, Nov. 22, 1985, abandoned.

[51] Int. Cl.$^4$ .................. H02J 7/14; H02K 11/00
[52] U.S. Cl. .................... 310/68 D; 320/15; 363/145
[58] Field of Search .......... 310/68 D, 72, 112; 307/16; 320/15; 322/90; 357/81; 361/386; 363/145

[56] References Cited

U.S. PATENT DOCUMENTS

| | | | |
|---|---|---|---|
| 3,001,121 | 9/1961 | Kerr, Jr. | 310/68 D |
| 3,962,621 | 6/1976 | Raver | 320/15 |
| 4,214,198 | 7/1980 | Schneider | 320/15 |
| 4,307,437 | 12/1981 | Severing | 310/68 D |
| 4,543,504 | 9/1985 | Iwaki et al. | 310/68 D |
| 4,546,280 | 8/1985 | Pflüger | 310/68 D |

Primary Examiner—Patrick R. Salce
Assistant Examiner—D. L. Rebsch
Attorney, Agent, or Firm—Wm. T. Wofford; James C. Fails; Arthur F. Zobal

[57] ABSTRACT

The dual output alternator has a three phase stator winding with three terminals. A first set of three diodes is provided, each of which has its anode connected to a different one of the three winding terminals. The cathodes of the diodes of the first set are connected together and to a first output terminal. A second set of three diodes is provided each of which has its anode connected to a different one of the three winding terminals. The cathodes of the diodes of the second set are connected together and to a second output terminal. A third set of three diodes is provided, each of which has its cathode connected to a different one of the winding terminals and its anode connected to ground.

A metal housing is provided for supporting the stator winding. Two metallic heat sink members are supported in the housing near one end wall thereof, spaced from each other and electrically insulated from the housing. One heat sink member supports the first set of three diodes and provides the electrical connection from their cathodes to the first output terminal. The other heat sink member supports the second set of three diodes and provides the electrical connection from their cathodes to the second output terminal. The housing wall supports the third set of three diodes and provides the ground connection to their anodes.

29 Claims, 11 Drawing Figures

DUAL OUTPUT ALTERNATOR

This is a continuation of co-pending application Ser. No. 801,137 filed Nov. 22, 1985, now abandoned.

BACKGROUND OF THE INVENTION

1. Field of the Invention

This invention relates to an alternator for use in a motor vehicle and which has two outputs for the vehicle battery and for an auxiliary battery.

2. Description of the Prior Art

My U.S. Pat. Nos. 4,161,683, 4,336,485, 4,347,473, 4,354,127, 4,356,418, 4,454,464, and 4,509,005 disclose different types of alternators and systems for supplying power. U.S. Pat. Nos. 4,336,485, 4,347,473, 4,356,418, and 4,454,464 disclose two alternators for supplying power to two batteries. A single alternator has been used to supply power to two batteries, however, external isolators are provided between the alternator and the two batteries. This results in a voltage drop between the alternator and the batteries which is undesirable.

SUMMARY OF THE INVENTION

It is an object of the invention to provide a dual output alternator for supplying power to two batteries wherein external isolators and hence the undesirable voltage drops are eliminated.

The dual output alternator comprises a three phase stator winding connected in a given configuration and having three terminals. A first set of three diodes is provided, each of which has its anode connected to a different one of the three winding terminals. The cathodes of the diodes of the first set are connected together and to a first output terminal. A second set of three diodes is provided, each of which has its anode connected to a different one of the three winding terminals. The cathodes of the diodes of the second set are connected together and to a second output terminal. A third set of three diodes is provided, each of which has its cathode connected to a different one of the winding terminals and its anode connected to ground.

In a further aspect, the dual output alternator comprises a metal housing for supporting said stator winding. Two heat sink members are supported in the housing near one end wall thereof, spaced from each other and electrically insulated from the housing. One heat sink member supports the first set of three diodes and provides the electrical connection from their cathodes to the first output terminal. The other heat sink member supports the second set of three diodes and provides the electrical connection from their cathodes to the second output terminal. The housing wall supports the third set of three diodes and provides the ground connection to their anodes.

DESCRIPTION OF THE PREFERRED EMBODIMENTS

Figure 1:
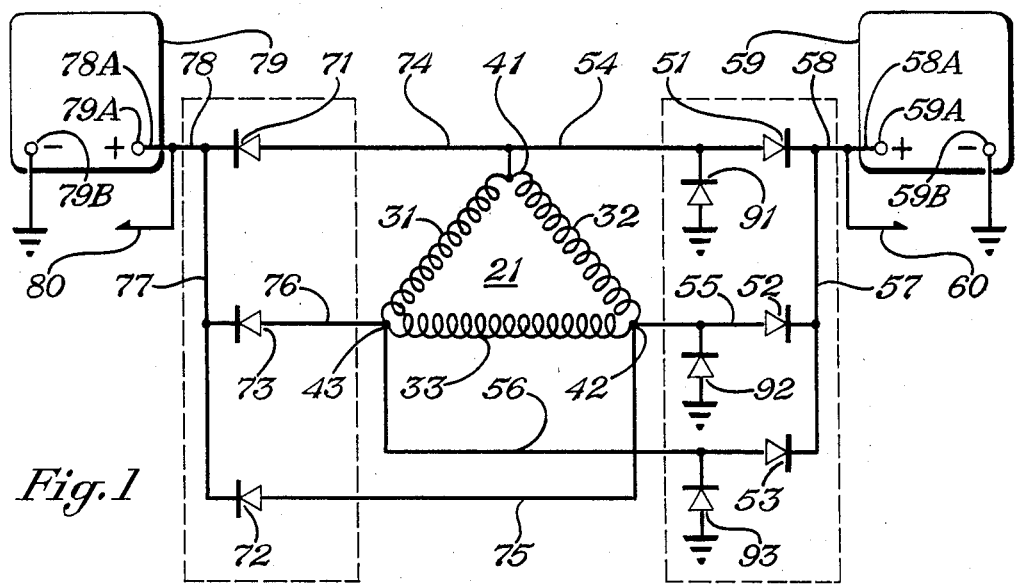
FIG. 1 is an electrical schematic of the invention employed with an alternator having a three phase delta winding.
Figure 2:
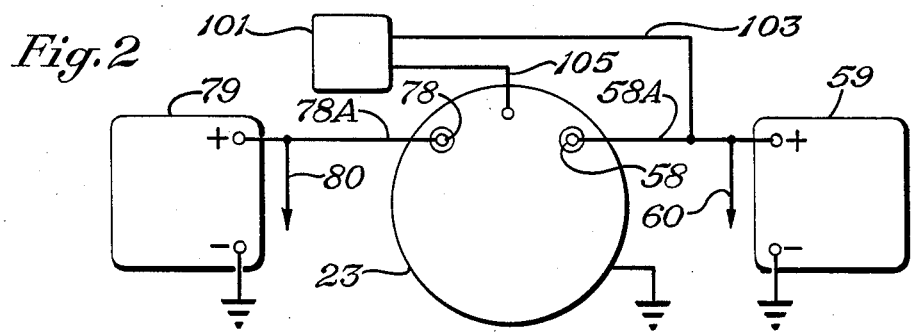
FIG. 2 is a block diagram of the alternator showing regulator connections.

Referring now to FIGS. 1 and 2 there is illustrated at 21 a three phase stator winding of an alternator 23. The winding 21 comprises three coil windings 31, 32, and 33 connected in a delta configuration. The windings are wound on an annular core, for example, in the manner as disclosed in U.S. Pat. No. 4,454,464 and U.S. Pat. No. 4,549,106 which are incorporated herein by reference. Other types of stator windings may be employed. The alternator also includes a rotor winding which is not shown herein, but may be of the type disclosed in U.S. Pat. No. 4,454,464 and U.S. Pat. No. 4,549,106. The alternator may be employed on a motor vehicle such as a recreational vehicle, ambulance, bus, etc.

Windings 31 and 32 are connected together and to a terminal 41; windings 32 and 33 are connected together and to a terminal 42; and windings 31 and 33 are connected together and to a terminal 43.

A first set of three positive diodes 51, 52, and 53 have their anodes connected to terminals 41, 42, and 43 by leads 54, 55, and 56 respectively. The cathodes of diodes 51, 52, and 53 are electrically connected together by connection 57 and then to an output terminal 58 which is one output terminal of the alternator. When the alternator is located and connected in the vehicle, output terminal 58 is connected by lead 58A to the positive terminal 59A of the vehicle battery 59 whose negative terminal 59B is connected to ground. A load line 60 is connected to lead 58A for supplying power to the vehicles chasis equipment such as the starter, lights, etc.

A second set of three positive diodes 71, 72 and 73 have their anodes connected to terminals 41, 42, and 43 by leads 74, 75, and 76 respectively. The cathodes of diodes 71, 72, and 72 are electrically connected together by connection 77 and then to an output terminal 78 which is the other output terminal of the alternator. The output terminal 78 will be connected by lead 78A to the positive terminal 79A of an auxiliary battery 79 whose negative terminal 79B is connected to ground. A load line 80 is connected to lead 78A for supplying power to auxiliary equipment of the vehicle such as an air conditioner, emergency equipment, etc.

A third set of three negative diodes 91, 92, and 93 have their cathodes connected to terminals 41, 42, and 43 by ways of leads 54, 55, and 56 respectively and their anodes connected to ground.

The two sets of diodes 51-53 and 91-93 act as full wave rectifiers of the outputs from winding terminals 41-43 to the vehicle battery 59 and the two sets of diodes 71-73 and 91-93 act as full wave rectifiers of the outputs from the winding terminals 41-43 to the auxiliary battery 79.

With this arrangement, battery 59 is isolated from battery 79 by way of diodes 51-53 and battery 79 is isolated from battery 59 by way of diodes 71-73. The isolation of the two batteries is important to prevent the vehicle battery 59 from being run down in the event that auxiliary battery 79 becomes run down and vice versa. Although not shown, a switch will be provided to allow battery 79 to start the vehicle in the event that battery 59 becomes run down.

Thus as can be understood, the diode arrangement disclosed allows a single alternator to operate both batteries, with both batteries being isolated from each other and wherein there are direct outputs from the alternator to the batteries without the need of exterior isolators.

Referring to FIG. 2 there is illustrated a conventional regulator 101 having a lead 103 connected to lead 58A and a lead 105 electrically coupled to the rotor winding (not shown). The regulator 101 controls the voltage of the battery 59 by sensing its voltage by way of lead 103 and controlling the current to the rotor winding by way of lead 105.

Figure 3:
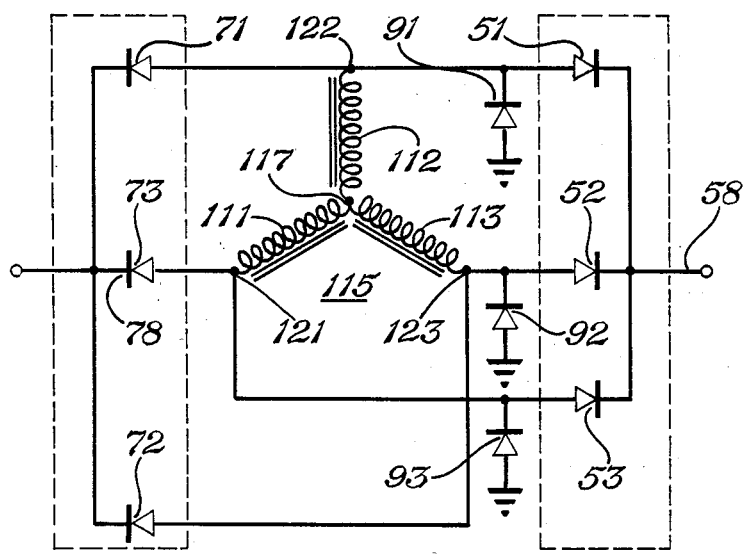
FIG. 3 is an electrical schematic of the invention employed with an alternator having a three phase Y winding.

The circuit of FIG. 3 is the same as that of FIG. 1 except that the coil windings of the stator winding are connected in a Y configuration. As shown windings 111, 112, and 113 of the stator winding 115 are connected together at 117 and have terminals 121, 122, and 123 to which the diodes previously described, are connected.

Figure 4:
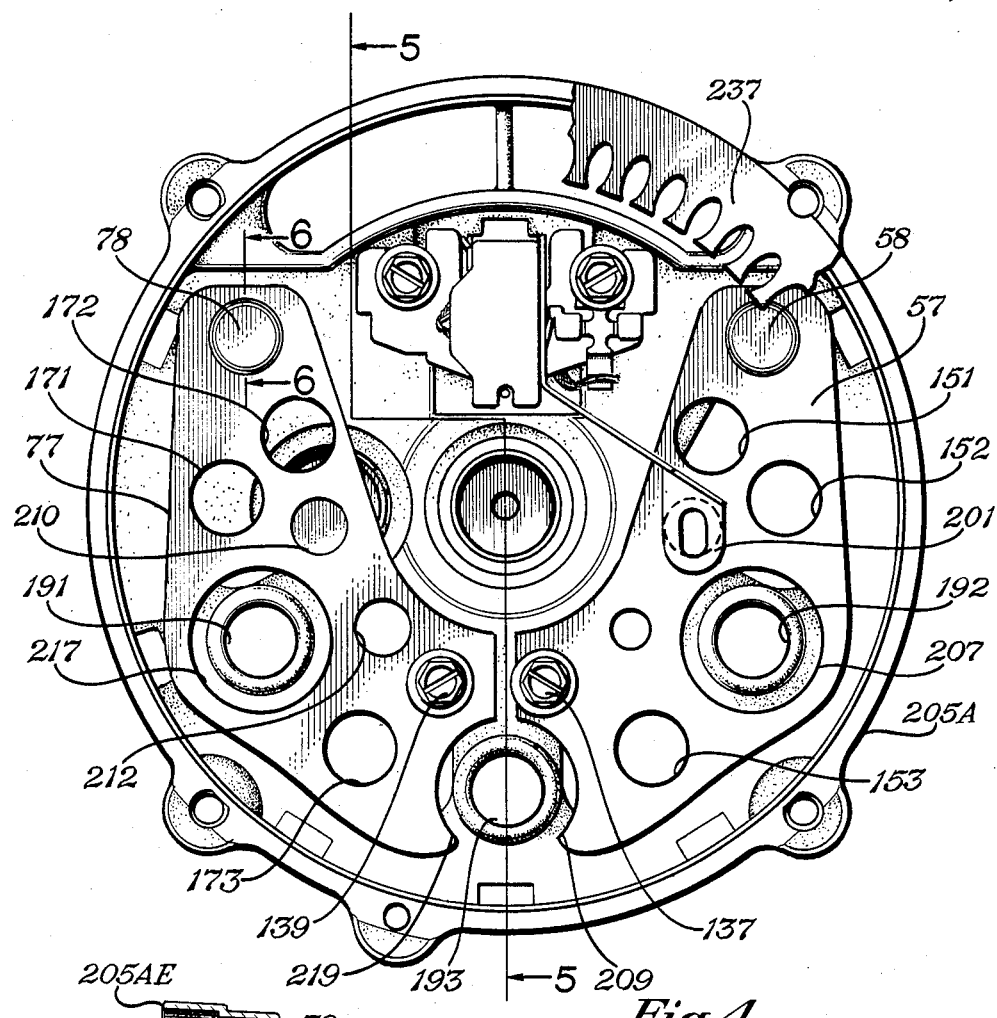
FIG. 4 is an inside view of the alternator housing showing two heat sink diode supporting members and the end wall with apertures for supporting a set of diodes.

The three phase coil windings of the stator winding will be wound on the annular stator core, a portion of which is shown at 237 in FIG. 4. More details of one type of 112, stator core and one more manner in which the windings may be wound on a core are disclosed in U.S. Pat. Nos. 4,454,464 and 4,549,106.

Figures 5, 6:
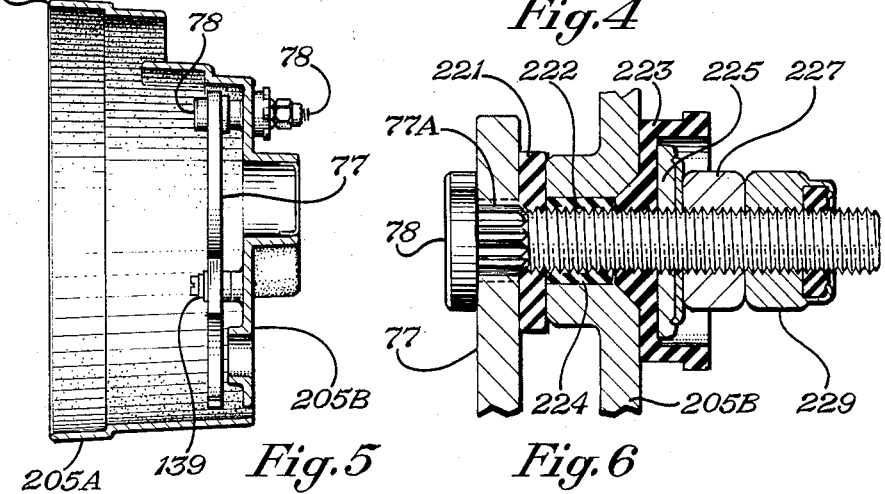
FIG. 5 is a cross section of FIG. 4 taken along the lines 5—5 thereof.
FIG. 6 is cross section of FIG. 4 taken along the lines 6—6 thereof.
Figure 11:
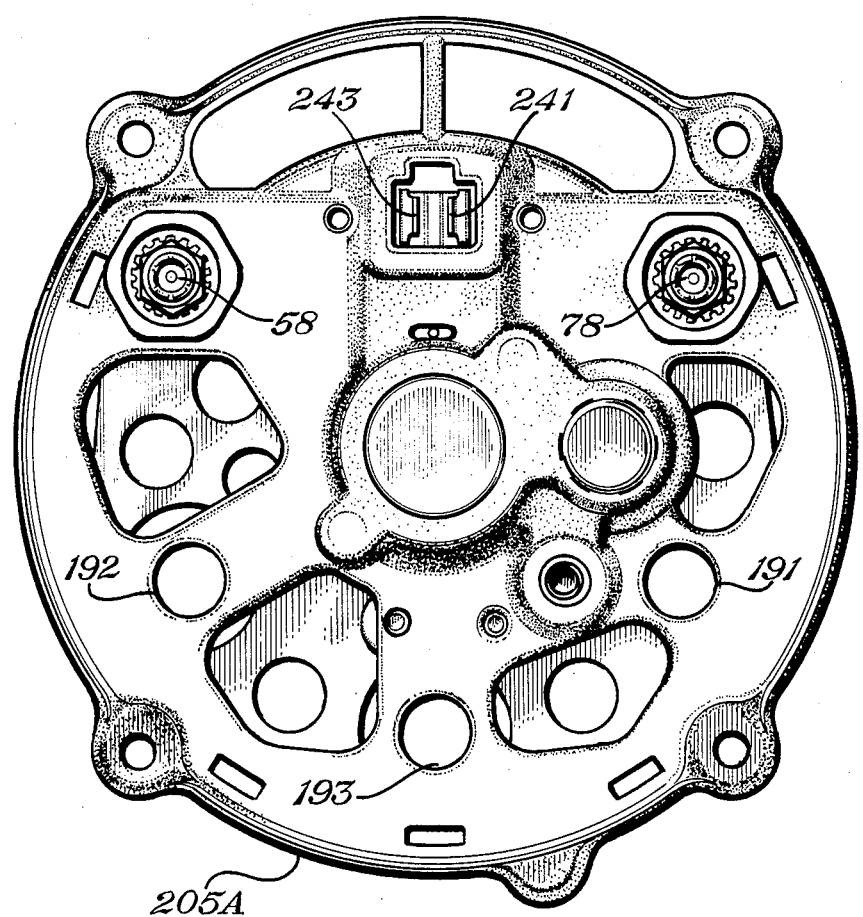
FIG. 11 is an outside end view of the housing of FIGS. 4 and 5.

The stator core and its windings are supported in a two member metal housing one member of which is shown at 205A in FIGS. 4, 5, and 11. The other member will be connected to edge 205AE of member 205A to form an enclosed housing in which the stator core and its winding are supported with the rotor coil supported for rotation within the stator core and winding as disclosed in U.S. Pat. Nos. 4,454,464 and 4,549,106.

The housing member 205A has an end wall 205B which supports two metal heat sink plate members 57 and 77 such that they are spaced from each other and from the housing member 205A and electrically insulated from each other and from the housing member 205A. Heat sink members 57 and 77 are substantially identical to each other but are supported in mirror image positions relative to each other. Bolt members 58 and 137 support plate 57 and bolt members 78 and 139 support plate 77 in the housing. Plate 57 supports diodes 51, 52, and 53 and plate 77 supports diodes 71, 72, and 73. The metal end wall 205B of housing member 205A supports diodes 91, 92 and 93.

Figure 9:
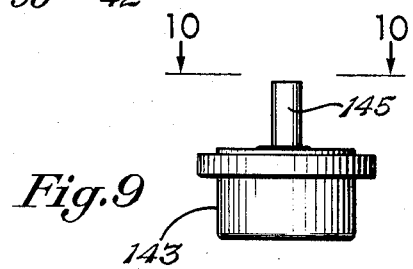
FIG. 9 is a side view of the exterior of one of the diodes.
Figure 10:
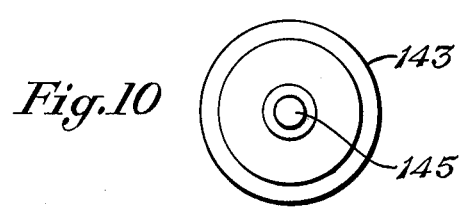
FIG. 10 is a view of FIG. 9 taken along the lines 10—10 thereof.

Referring to FIGS. 9 and 10 each of the diodes 51-53, 71-73 and 91-93 comprise a cylindrical metal casing 143 with a terminal 145 electrically insulated from the casing. For each of the diodes 5-53 and 71-73, its casing 143 is electrically connected to its cathode and terminal 145 is electrically connected to its anode. For each of diodes 91-93, its casing 143 is electrically connected to its anode and the terminal 145 is electrically connected to its cathode.

Plate 57 has three apertures 151, 152, and 153 formed therethrough in which the casings of diodes 51, 52, and 53 are press fitted and plate 77 has three apertures 171, 172, and 173 in which the casings of diodes 71, 72, and 73 are press fitted. Thus plate 57 electrically connects the cathodes of diodes 51-53 together and plate 77 electrically connects the cathodes of diodes 71-73 together. The plates 57 and 77 also act to dissipate head from diodes 51-53 and 71-73 respectively.

The end wall 205B of the housing has three apertures 191-193 in which the diodes 91-93 are press fitted. Thus the end wall 205B of the housing electrically connects the anodes of the diodes 91-93 together and to ground and acts to dissipate heat from the diodes 91-93. Bolt members 58 and 78 are electrically attached to plates 57 and 77 and form the output terminals. They extend through the end wall 205B and are electrically insulated therefrom.

Plate 57 also has two apertures through which bolts 58 and 137 extend; an aperture 201 in which an insulating member 203 is located for supporting a connection terminal; an aperture 207 through which leads from diode 92 extend; and an end slot 209 through which a lead from diode 93 extends. Plate 77 also has apertures 77A and 77B through which bolts 78 and 139 extend, an aperture 210 in which an insulating member 211 is located for supporting a connection terminal; an aperture 212 in which an insulating member 213 is located for supporting a connection terminal; an aperture 217 through which leads from diode 91 extend; and an end slot 219 through which a lead from diode 93 extends.

FIG. 6 illustrates the manner in which bolt 78 supports one end of plate 77 such that it is insulated from the housing. The shank of the bolt 78 is press fitted through aperture 77A and is slipped through a plastic electrically insulating washer 221 and sleeve 222 and through a plastic electrically insulating washer 223 located against the outside surface of end wall 205B. Sleeve 222 and a portion of washer 223 are located in an aperture 224 formed through end wall 205B. The assembly is held in place by a washer 225 and a nut 227 screwed to the shank of the bolt 78. Nut 229 is used for attaching a lead to the shank of the bolt 78. Bolt 58 supports one end of plate 57 in a similar manner.

Figure 8:
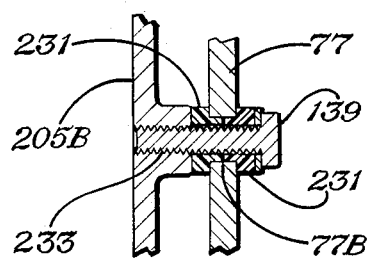
FIG. 8 is a cross-section of FIG. 7 taken along the lines 8—8 thereof.

FIG. 8 illustrates the manner in which bolt 139 supports the other end of plate 77. The bolt is screwed through electrically insulating grommets 231 located in aperture 77B and into threaded aperture 233 formed through end wall 205B. Bolt 137 supports the other end of plate 77 in a similar manner.

Figure 7:
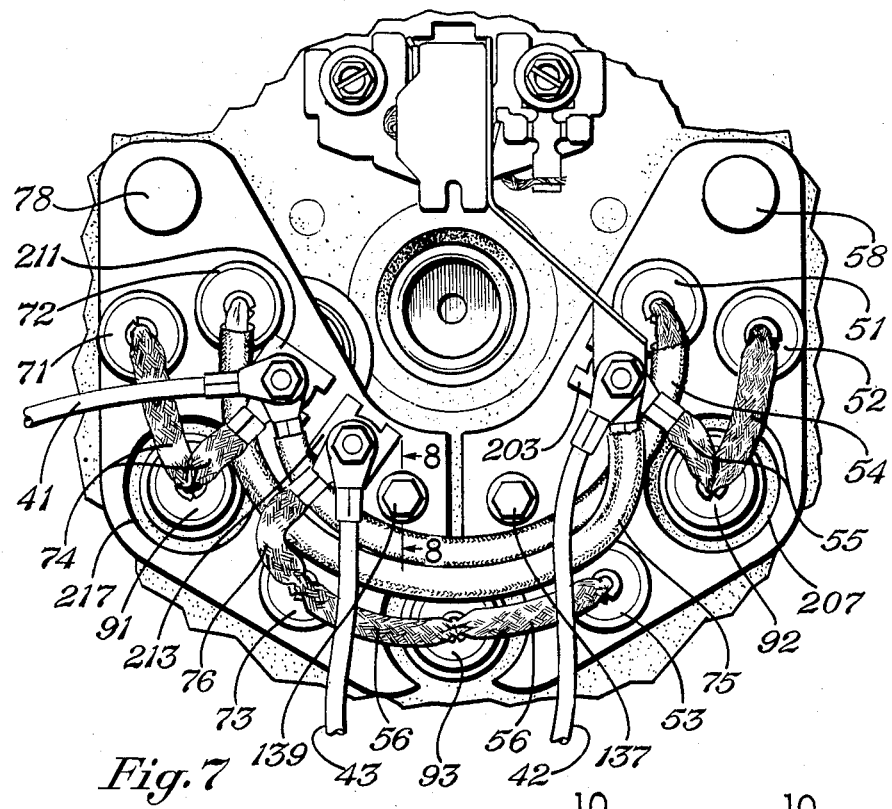
FIG. 7 is a partial inside view of the alternator housing showing the diodes in place and connected together.

In FIG. 7, diode 91 is shown connected to lead 74 and terminal 43 is shown connected to lead 56 through lead 76, however, this is the electrical equivalence of the circuit of FIG. 1.

Referring to FIG. 11, terminal 241 is employed for applying the output field voltage from the regulator to the rotor by way of a brush. Terminal 243 is a stator tap for a half wave voltage.

Thus the alternator of the invention provides a compact means for supporting the diodes, with suitable heat dissipation, connected to two output terminals for providing two outputs electrically isolated from each other, without the need of external isolators.

I claim:

1. A dual output alternator for a motor vehicle, comprising:
    a three phase stator winding connected in a given configuration and having three terminals, a metal housing, means for supporting said stator winding in said housing, a first set of three diodes supported in said housing, each of said diodes of said of first set having its anode connected directly to a different one of said three terminals, the cathodes of said diodes of said first set being connected together and to a first output terminal, a second set of three diodes supported in said housing, each of said diodes of said second set having its anode connected directly to a different one of said three terminals, the cathodes of said diodes of said second set being connected together and to a second output terminal, a third set of three diodes, each of said diodes of said third set having its cathode connected directly to a different one of said three terminals and its anode electrically coupled to said housing, said first set of three diodes and said third set of three diodes forming a first full wave rectifier, said second set of three diodes and said third set of three diodes forming a second full wave rectifier, said first and second full wave rectifiers being connected to the same ground potential by way of said third set of three diodes.

2. The dual output alternator of claim 1, comprising:

a first battery having a positive terminal connected to said first output terminal and a negative terminal connected to ground, a first load connection connected to said first output terminal, a second battery having a positive terminal connected to said second output terminal and a negative terminal connected to ground, and a second load connection connected to said second output terminal.

3. The dual output alternator of claim 1, comprising:

two metallic heat sink members, means for supporting said two heat sink members inside of said housing with said two heat sink members being electrically insulated from each other and from said metal housing, one of said heat sink members supporting said first set of three diodes and providing the electrical connection from their cathodes to said first output terminal, the other of said heat sink members supporting said second set of three diodes and providing the electrical connection from their cathodes to said second output terminal, said first output terminal being connected to said first heat sink member and extending through the wall of said housing and being electrically insulated therefrom, said second output terminal being connected to said second heat sink member and extending through the wall of said housing and being electrically insulated therefrom.

4. The dual output alternator of claim 3, comprising:

a first battery having a positive terminal connected to said first output terminal and a negative terminal connected to ground, a first load connection connected to said first output terminal, a second battery having a positive terminal connected to said second output terminal and a negative terminal connected to ground, and a second load connection connected to said second output terminal.

5. The dual output alternator of claim 1, comprising:

first and second metallic heat sink members, means for supporting said first and second heat sink members inside of said metal housing with said two heat sink members being electrically insulated from each other and from said metal housing, each of said diodes of said first set of three diodes and of said second set of three diodes having a metal casing electrically coupled to its cathode, said first heat sink member having three apertures for receiving said first set of three diodes respectively such that their casings are in electrical contact with said first heat sink member and said first heat sink member acts to dissipate heat from said first set of three diodes, said second heat sink member having three apertures for receiving said second set of three diodes respectively such that their casings are in electrical contact with said second heat sink member and said second heat sink member acts to dissipate heat from said second set of three diodes, said first output terminal being connected to said first heat sink member and extending through the wall of said housing and being electrically insulated therefrom, said second output terminal being connected to said second heat sink member and extending through the wall of said housing and being electrically insulated therefrom, each of said diodes of said third set of three diodes having a metal casing electrically coupled to its anode, the casings of said third set of three diodes being electrically coupled to said housing which forms a ground connection.

6. The dual output alternator of claim 5, comprising:

a first battery having a positive terminal connected to said first output terminal and a negative terminal connected to ground, a first load connection connected to said first output terminal, a second battery having a positive terminal connected to said second output terminal and a negative terminal connected to ground, and a second load connection connected to said second output terminal.

7. A housing for a dual output alternator of the type having an annular stator core with electrical winding means thereon, comprising:

a metal housing having an annular side wall and an end wall for supporting the annular stator core and its winding means, a first set of diodes, a second set of diodes, first and second metallic heat sink members, support means for supporting said first and second heat sink members inside of said metal housing spaced from each other and electrically insulated from said metal housing, said support means supporting said first and second heat sink members near said end wall on opposite sides of a plane passing through the axis of said annular side wall transverse to said end wall, one of said heat sink members supporting said first set of diodes and electrically connecting their cathodes together, the other of said heat sink members supporting second set of diodes and electrically connecting their cathodes together, a first output means electrically connected to said first heat sink member and extending through the wall of said housing and being electrically insulated therefrom, and a second output means electrically connected to said second heat sink member and extending through the wall of said housing and being electrically insulated therefrom.

8. The housing of claim 7 wherein:

each of said diodes of said first set of diodes and of said second set of diodes has a metal casing electrically coupled to its cathode, said first heat sink member has apertures for receiving said first set of diodes such that their casings are in electrical contact with said first heat sink member and said first heat sink member acts to discipate heat from said first set of diodes, said second heat sink member has apertures for receiving said second set of diodes such that their casings are in electrical contact with said second heat sink member and said second heat sink member acts to discipate heat from said second set of diodes.

9. A dual output alternator for a motor vehicle, comprising:

a metal housing having an annular side wall and an end wall, an annular stator core supported in said metal housing, a three phase stator winding connected in a given configuration and having three terminal means, said stator core supporting said stator winding in said metal housing, a first set of three diodes, each of said diodes of said first set of three diodes having its anode connected directly to a different one of said three terminal means, a second set of three diodes, a third set of three diodes, each of said diodes of said third set of three diodes having its cathode connected directly to a different one of said three terminal means and its anode electrically coupled to said metal housing, first and second metallic heat sink members, support means for supporting said first and second heat sink members inside of said metal housing near said end wall spaced from each other and electrically insulated from said metal housing, said support means supports said first and second heat sink members on opposite sides of a plane passing through the axis of said annular side wall transverse to said end wall, said first heat sink member supporting said first set of three diodes and electrically connecting their cathodes together, said second heat sink member supporting said second set of three diodes and electrically connecting their cathodes together, a first output means electrically connected to said first heat sink member and extending through the wall of said housing and being electrically insulated therefrom, and a second output means electrically connected to said second heat sink member and extending through the wall of said housing and being electrically insulated therefrom, each of said diodes of said third set of three diodes having its anode electrically coupled to said metal housing.

10. The dual output alternator of claim 9, wherein:

each of said diodes of said first set of three diodes and of said second set of three diodes has a metal casing electrically coupled to its cathode, said first heat sink member has three apertures for receiving said first set of three diodes respectively such that their casings are in electrical contact with said first heat sink member and said first heat sink member acts to discipate heat from said first set of three diodes, said second heat sink member has three apertures for receiving said second set of three diodes respectively such that their casings are in electrical contact with said second heat sink member and said second heat sink member acts to discipate heat from said second set of three diodes, each of said diodes of said third set of three diodes has a metal casing electrically coupled to its anode, said casings of said third set of three diodes are electrically coupled to the wall of said housing forming a ground connection therewith.

11. A housing apparatus for a dual output alternator of the type having an annular stator core with electrical winding means thereon, comprising:

a metal housing, first and second full wave rectifier means, said first rectifier means comprising a first set of diodes located within said housing, a first metallic heat sink member located within said housing, said first heat sink member supporting said first set of diodes and connecting their cathodes together, said second rectifier means comprising a second set of diodes located within said housing, a second metallic heat sink member located within said housing, said second heat sink member supporting said second set of diodes and connecting their cathodes together, said first and second heat sink members being electrically insulated from each other and from said metal housing, a first output means electrically connected to said first heat sink member and extending through the wall of said housing and being electrically insulated therefrom, a second output means electrically connected to said second heat sink member and extending through the wall of said housing and being electrically insulated therefrom, said first and second full wave rectifier means each being electrically connected to said housing and hence to the same ground potential.

12. The housing apparatus of claim 11, wherein:
said first set of diodes comprises three diodes,
said second set of diodes comprises three diodes.

13. The housing apparatus of claim 11, wherein:
each of said diodes of said first set of diodes and of said second set of diodes has a metal casing electrically coupled to its cathode, said first heat sink member having apertures for receiving first set of diodes such that their casings are in electrical contact with said first heat sink member and first heat sink member acts to dissipate heat from said first set of diodes, said second heat sink member having apertures for receiving said second set of diodes such that their casings are in electrical contact with said second heat sink member and said second heat sink member acts to dissipate heat from said second set of diodes.

14. The housing apparatus of claim 12, wherein:

each of said diodes of said first set of three diodes and of said second set of three diodes has a metal casing electrically coupled to its cathode, said first heat sink member having three apertures for receiving said first set of three diodes respectively such that their casings are in electrical contact with said first heat sink member and said first heat sink member acts to dissipate heat from said first set of three diodes, said second heat sink member having three apertures for receiving said second set of three diodes respectively such that their casings are in electrical contact with said second heat sink member and said second heat sink member acts to dissipate heat from said second set of three diodes.

15. A housing apparatus for a dual output alternator of the type having an annular stator core with electrical winding means thereon, comprising:

a metal housing, first and second full wave rectifier means, said first rectifier means comprising a first set of diodes located within said housing, a first metallic heat sink member located within said housing, said first heat sink member supporting said first set of diodes and connecting their cathodes together, said second rectifier means comprising a second set of diodes located within said housing, a second metallic heat sink member located within said housing, said second heat sink member supporting said second set of diodes and connecting their cathodes together, said first and second heat sink members being electrically insulated from each other and from said metal housing, each of said first and second rectifier means comprising a set of diodes having their anodes electrically coupled to said metal housing, a first output means electrically connected to said first heat sink member and extending through the wall of said housing and being electrically insulated therefrom, a second output means electrically connected to said second heat sink member and extending through the wall of said housing and being electrically insulated therefrom.

16. The housing apparatus of claim 15, wherein:

said first set of diodes comprises three diodes, said second set of diodes comprises three diodes, said set of diodes of each of said first and second rectifier means having their anodes electrically coupled to said metal housing comprises three diodes.

17. The housing apparatus of claim 16, wherein:

each of said diodes of said first set of three diodes and of said second set of three diodes has a metal casing electrically coupled to its cathode, said first heat sink member having three apertures for receiving said first set of three diodes respectively such that their casings are in electrical contact with said first heat sink member and said first heat sink member acts to dissipate heat from said first set of three diodes, said second heat sink member having three apertures for receiving said second set of three diodes respectively such that their casings are in electrical contact with said second heat sink member and said second heat sink member acts to dissipate heat from said second set of three diodes, each of said diodes having their anodes electrically coupled to said metal housing has a metal casing electrically coupled to its anode and which is electrically coupled to said metal housing.

18. A dual output alternator for a motor vehicle, comprising:

a metal housing, a three phase stator winding connected in a given configuration and having three terminals, means for supporting said stator winding in said housing, first and second full wave rectifier means, said first rectifier means comprising a first set of three diodes located in said housing, a first metallic heat sink member located in said housing, said first heat sink member supporting said first set of three diodes and connecting their cathodes together, each of said diodes of said first set of three diodes having its anode connected to a different one of said three terminals, said second rectifier means comprising a second set of three diodes located in said housing, a second metallic heat sink member located within said housing, said second heat sink member supporting said second set of three diodes and connecting their cathodes together, each of said diodes of said second set of three diodes having its anode connected to a different one of said three terminals, said first and second heat sink members being electrically insulated from each other and from said housing, a first output means electrically connected to said first heat sink member and extending through the wall of said housing and being electrically insulated therefrom, a second output means electrically connected to said second heat sink member and extending through the wall of said housing and being electrically insulated therefrom, said first and second full wave rectifier means each being electrically connected to said housing and hence to the same ground potential.

19. The dual output alternator of claim 18, wherein:

each of said diodes of said first set of three diodes has its anode connected directly to a different one of said three terminals, each of said diodes of said second set of three diodes has its anode connected directly to a different one of said three terminals.

20. The dual output alternator of claim 19, comprising:
a first battery having a positive terminal connected to said first output terminal and a negative terminal connected to ground, and
a second battery having a positive terminal connected to said second output terminal and a negative terminal connected to ground.

21. The dual output alternator of claim 18, wherein:
each of said first and second rectifier means comprises a set of three diodes having their anodes electrically coupled to said metal housing.

22. The dual output alternator of claim 21, wherein:
each of said diodes of said first set of three diodes has its anode connected directly to a different one of said three terminals,
each of said diodes of second set of three diodes has its anode connected directly to a different one of said three terminals,
said set of three diodes of each of said first and second rectifier means having their anodes electrically coupled to said metal housing have their anodes directly coupled to said metal housing.

23. A dual output alternator for a motor vehicle, comprising:
a metal housing having a side wall and an end wall,
a stator core supported in said housing,
a three phase stator winding connected in a given configuration and having three terminals,
said stator core supporting said stator winding in said housing,
a first set of three diodes supported in said housing,
each of said diodes of said first set having its anode connected to a different one of said three terminals,
the cathodes of said diodes of said first set being connected together and to a first output terminal,
a second set of three diodes supported in said housing,
each of said diodes of said second set having its anode connected to a different one of said three terminals,
the cathodes of said diodes of said second set being connected together and to a second output terminal,
a third set of three diodes,
each of said diodes of said third set having its cathode connected to a different one of said three terminals and its anode electrically coupled to said housing,
said first set of three diodes and said third set of three diodes forming a first full wave rectifier,
said second set of three diodes and said third set of three diodes forming a second full wave rectifier,
said first and second full wave rectifiers being connected to the same ground potential by way of said third set of three diodes.

24. A dual output alternator for a motor vehicle, comprising:
a metal housing having an annular side wall and an end wall,
an annular stator core supported in said housing,
a three phase stator winding connected in a given configuration and having three terminals,
said stator core supporting said stator winding in said housing,
a first set of three diodes,
a first metallic heat sink member located in said housing,
said first heat sink member supporting said first set of three diodes and connecting their cathodes together,
each of said diodes of said first set having its anode connected to a different one of said three terminals,
a second set of three diodes,
a second metallic heat sink member located in said housing,
said second heat sink member supporting said second set of three diodes and connecting their cathodes together,
each of said diodes of said second set having its anode connected to a different one of three terminals,
support means for supporting said first and second heat sink members inside of said housing spaced from each other and electrically insulated from said housing,
said support means supports said first and second heat sink members near said end wall on opposite sides of a plane passing through the axis of said annular side wall transverse to said end wall,
a first output means electrically connected to said first heat sink member and extending through the wall of said housing and being electrically insulated therefrom, and
a second output means electrically connected to said second heat sink member and extending through the wall of said housing and being electrically insulated therefrom.

25. A dual output alternator for a motor vehicle, comprising:
a metal housing having an annular side wall and an end wall,
an annular stator core supported in said housing,
a three phase stator winding connected in a given configuration and having three terminals,
said stator core supporting said stator winding in said housing,
a first set of three diodes,
a first metallic heat sink member located in said housing,
said first heat sink member supporting said first set of three diodes and connecting their cathodes together,
each of said diodes of said first set having its anode directly connected to a different one of said three terminals,
a second set of three diodes,
a second metallic heat sink member located in said housing,
said second heat sink member supporting said second set of three diodes and connecting their cathodes together,
each of said diodes of said second set having its anode directly connected to a different one of three terminals,
support means for supporting said first and second heat sink members inside of said housing spaced from each other and electrically insulated from said housing,
said support means supports said first and second heat sink members near said end wall on opposite sides of a plane passing through the axis of said annular side wall transverse to said end wall,
a first output means electrically connected to said first heat sink member and extending through the wall of said housing and being electrically insulated therefrom, and
a second output means electrically connected to said second heat sink member and extending through the wall of said housing and being electrically insulated therefrom.

26. A dual output alternator for a motor vehicle, comprising:
  a metal housing having an annular side wall and an end wall,
  an annular stator core supported in said housing,
  a three phase stator winding connected in a given configuration and having three terminals,
  said stator core supporting said stator winding in said housing,
  a first set of three diodes,
  a first metallic heat sink member located in said housing,
  said first heat sink member supporting said first set of three diodes and connecting their cathodes together,
  each of said diodes of said first set having its anode connected to a different one of said three terminals,
  a second set of three diodes,
  a second metallic heat sink member located in said housing,
  said second heat sink member supporting said second set of three diodes and connecting their cathodes together,
  each of said diodes of said second set having its anode connected to a different one of three terminals,
  support means for supporting said first and second heat sink members inside of said housing spaced from each other and electrically insulated from said housing,
  said support means supports said first and second heat sink members near said end wall on opposite sides of a plane passing through the axis of said annular side wall transverse to said end wall,
  a first output means electrically connected to said first heat sink member and extending through the wall of said housing and being electrically insulated therefrom,
  a second output means electrically connected to said second heat sink member and extending through the wall of said housing and being electrically insulated therefrom,
  a third set of three diodes,
  each of said diodes of said third set having its cathode connected to a different one of said three terminals and its anode electrically coupled to said housing,
  said first set of three diodes and said third set of three diodes forming a first full wave rectifier,
  said second set of three diodes and said third set of three diodes forming a second full wave rectifier,
  said first and second full wave rectifiers being connected to the same ground potential by way of said third set of three diodes.

27. A dual output alternator for a motor vehicle, comprising:
  a metal housing having an annular side wall and an end wall,
  an annular stator core supported in said housing,
  a three phase stator winding connected in a given configuration and having three terminals,
  said stator core supporting said stator winding in said housing,
  a first set of three diodes,
  a first metallic heat sink member located in said housing,
  said first heat sink member supporting said first set of three diodes and connecting their cathodes together,
  each of said diodes of said first set having its anode directly connected to a different one of said three terminals,
  a second set of three diodes,
  a second metallic heat sink member located in said housing,
  said second heat sink member supporting said second set of three diodes and connecting their cathodes together,
  each of said diodes of said second set having its anode directly connected to a different one of three terminals,
  support means for supporting said first and second heat sink members inside of said housing spaced from each other and electrically insulated from said housing,
  said support means supports said first and second heat sink members near said end wall on opposite sides of a plane passing through the axis of said annular side wall transverse to said end wall,
  a first output means electrically connected to said first heat sink member and extending through the wall of said housing and being electrically insulated therefrom,
  a second output means electrically connected to said second heat sink member and extending through the wall of said housing and being electrically insulated therefrom,
  a third set of three diodes,
  each of said diodes of said third set having its cathode directly connected to a different one of said three terminals and its anode electrically coupled to said housing,
  said first set of three diodes and said third set of three diodes forming a first full wave rectifier,
  said second set of three diodes and said third set of three diodes forming a second full wave rectifier,
  said first and second full wave rectifiers being connected to the same ground potential by way of said third set of three diodes.

28. The dual output alternator of claim 27, wherein:
  each of said first and second metallic heat sink members comprises a generally flat member having first and second bolt receiving apertures formed therethrough for receiving first and second supporting bolts,
  first supporting bolts extending through said first supporting bolt receiving apertures of said first and second heat sink members and having threaded ends secured to and extending through said end wall of said metal housing,
  second bolts extending through said second bolt receiving apertures of said first and second heat sink members and having ends secured to said end wall,
  said first and second supporting bolts of said first and second heat sink members forming said support means for supporting said first and second heat sink members inside of said housing spaced from each other and from said end wall,
  means for electrically insulating said first and second support bolts of said first and second heat sink members from said end wall,
  said first supporting bolts of said first and second heat sink members forming said first and second output means respectively.

29. The dual output alternator of claim 28, wherein:
  each of said first and second heat sink members has a lead receiving aperture formed therethrough for receiving electrical leads from at least one of said diodes of said third set.

* * * * *